Jan. 24, 1967 A. J. LUBERTS 3,300,593
ELECTRICAL BUS BAR HEATER SYSTEM
Filed Oct. 14, 1963 2 Sheets-Sheet 1
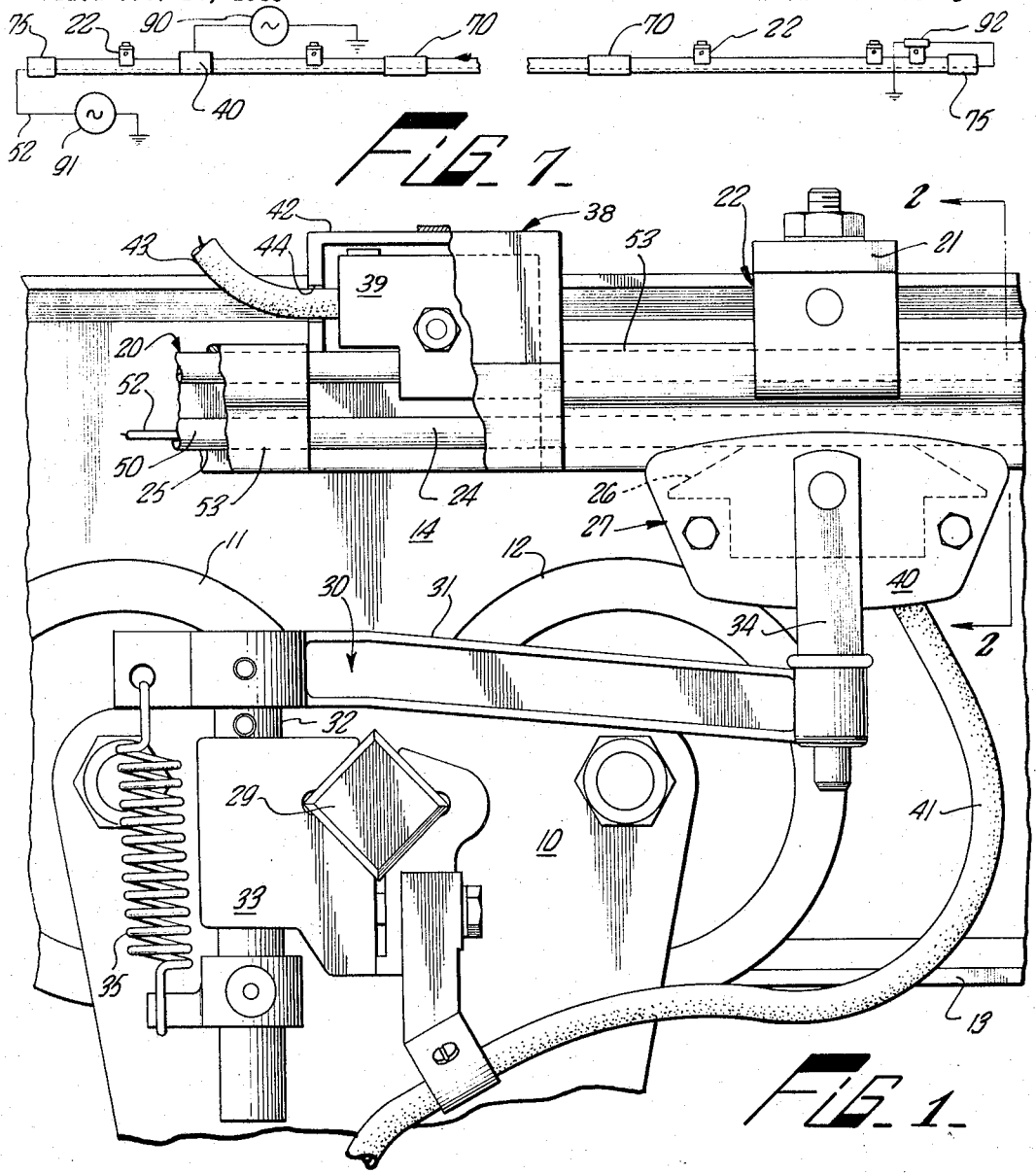
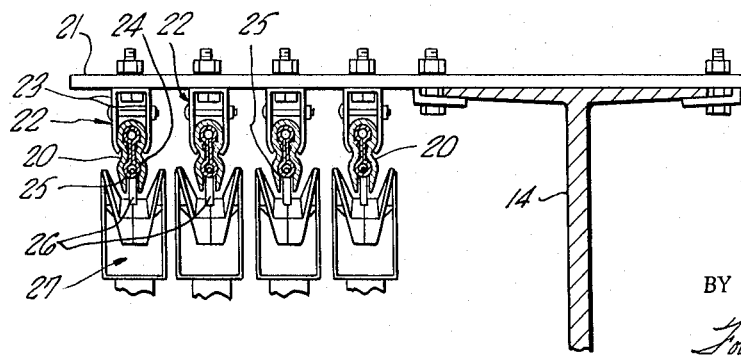
INVENTOR.
ALFRED J. LUBERTS
BY
ATTORNEYS.

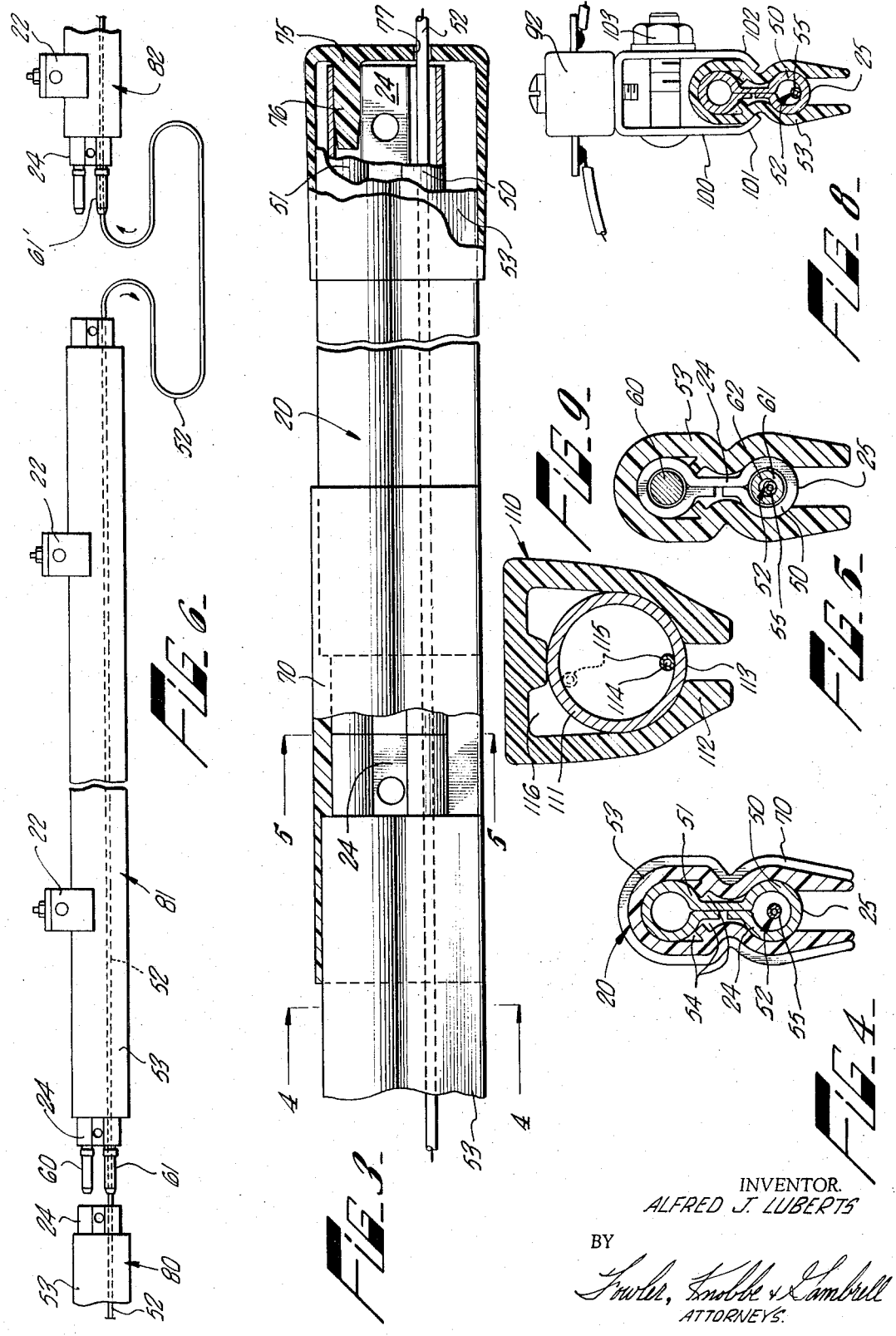

United States Patent Office 3,300,593
Patented Jan. 24, 1967

3,300,593
ELECTRICAL BUS BAR HEATER SYSTEM
Alfred J. Luberts, Seattle, Wash., assignor to Insul-8 Corp., San Carlos, Calif., a corporation of California
Filed Oct. 14, 1963, Ser. No. 316,058
8 Claims. (Cl. 191—27)

The present invention relates to improvements in trolley electrification systems, and, more particularly, to a heated system which inhibits the formation and retention of frozen moisture on the electrical bus bar.

Trolley electrification systems are widely employed for supplying electrical power to mobile machinery, for example, to an electrical hoist mounted on a carriage suspended on wheels which roll along a supporting rail. In a representative system, one or more conductor bus bar assemblies are supported from and extend along the rail and a corresponding number of electrical collectors are mounted on the carriage and held in engagement with exposed surfaces of the bus bars as the carriage moves along the rail.

A particular problem encountered in colder climes is that ice, sleet, snow and frost are formed on and retained on the exposed portion of the conductor bar. This frozen moisture obstructs the smooth passage of the movable collector, often resulting in the collector being physically displaced from the conductor bar. Moreover, the collector may even be frozen fast to the conductor bus bar. Further, the frozen moisture provides a very high resistance path for the passage of electrical current, resulting in a substantial disruption of electrical power to the mobile machinery.

The present invention provides a successful and economical solution for this problem. Briefly, in accordance with a preferred embodiment of the invention, a trolley electrification system includes a bus bar assembly having a conductive member of which an external elongated portion serves as the contact surface for the movable electrical collector. An insulated resistance heater wire mounted in the interior of this bus bar assembly parallel to the elongated contact surface is connected to a suitable electrical power source for heating the exposed contact surface.

A substantial portion of the exterior surface of the bus bar is covered by a sheath formed of a low heat conductivity material. This sheath serves the dual purposes of covering substantially all of the bus bar except the contact surface with an electrically insulating sheath and of retaining the heat energy supplied by the electrical heater wire. The heat supplied from this heater wire in combination with the heat retaining insulating cover has been found to maintain the exposed contact surface free of ice and snow under quite severe weather conditions.

Advantageously, the bus bar assembly is such that the electrical heater wire is retained proximate the interior wall of the exposed contact surface. Preferably, the bus bar is of oblong configuration with a hollow and substantially closed conductive lobe disposed adjacent the contact surface and a substantial conductive portion remote from the contact surface. The heater wire extends through the hollow, substantially closed lobe and is thereby retained proximate the interior wall of the exposed contact surface.

Another feature of the present invention is that the heated bus bar may be economically manufactured. In a preferred embodiment, the electrical resistance heater wire is provided with a uniform outside configuration and each bus bar section forms a continuous cavity proximate the exposed contact surface. The heated bus bar is then assembled by merely pushing the uniform heater wire through the end of this hollow cavity until it reaches the other end.

Other and further objects, features, and advantages of the invention will become apparent from the following detailed description taken in connection with the accompanying drawings in which:

FIG. 1 is a fragmentary elevation view of a rail mounted carriage with a heated bus bar assembly mounted along the rail and a corresponding collector assembly mounted on the carriage;

FIG. 2 is an end elevation taken generally along line 2—2 of FIG. 1 showing a plurality of parallel mounted conductor bars and their associated collector assemblies;

FIG. 3 is an enlarged elevation view of a portion of heated bus bar;

FIGS. 4 and 5 are sectional views respectively taken along lines 4—4 and 5—5 of FIG. 3.

FIG. 6 illustrates the assembly of a trolley electrification system embodying the improvements of this invention;

FIG. 7 is a circuit schematic illustrating independent means for supplying electrical power to the bus bar and to the bus bar heater system;

FIG. 8 illustrates a preferred mounting means for a thermostat for the bus bar heater system; and FIG. 9 is a cross-sectional view of an alternative bus bar assembly embodying certain of the useful features of the invention.

Referring now to FIG. 1, a mobile machine comprises a carriage 10 suspended on wheels 11, 12 which roll along the lower flange 13 of a supporting rail 14. The carriage 10 may carry an electrically powered hoist or other equipment (not shown).

A trolley electrification system includes one or more electrically conductive bus bar assemblies 20 fixedly supported parallel to the rail 14 by a cantilever hanger bracket 21 fixed to the top surface of the rail 14 (FIG. 2). A sufficient number of hanger clamps 22 depend from the bracket 21 to suspend each bus bar assembly. As shown, each clamp includes depending side walls 23 which grip the side walls of the bus bar. Each bus bar assembly includes a longitudinally extending, electrically conductive bus bar 24 having an exposed surface 25 engaged by a conductive shoe or brush 26 mounted in a collector head 27 included in a collector assembly 30.

A representative collector assembly 30 is shown in FIG. 1 supported on a square cantiliver mounting beam 29 which extends rigidly from the carriage 10. For convenience, only one such collector assembly is shown in this figure, although it will be apparent that several such assemblies may be supported upon a common beam 29 in side-by-side relationship. The collector assembly includes an arm 31 pivoted to an arm support post 32. This post is mounted by a collector support bracket 33. The other end of arm 31 is pivotally connected to and mounts a collector head support yoke 34. A constant upward bias is applied to yoke 34 by a coil spring 35 connected between the opposite end of arm 31 and the support post 32.

The collector head 27 includes a pair of identical opposed cheeks or side walls 40 formed of an electrically insulating material; the conductive shoe 26; and a cable 41 for making electrical connection to the collector shoe or brush 26. The cheeks 40 guide the collector head along the opposite surfaces of the bus bar assemblies 20 so that electrical contact is made between the exposed contact surface 25 of the bus bar and the shoe or brush 26.

A power feed member 38 provides means for supplying electrical energy to the bus bar 24. This member advantageously comprises a conductive clamp 39 fixedly attached to the bus bar 24 and an electrically insulating case 42 enclosing the clamp 39. A cable 43 attached to the clamp 39 extends through an aperture 44 of case 42 to an external power source.

Detailed views of a preferred embodiment of a heated bus bar assembly constructed in accordance with this invention are shown in FIGS. 3, 4 and 5. Each section has a uniform, oblong cross-sectional configuration comprising a bus bar 24 of composite cross-section, an insulated resistance heater wire 52 and a sheath 53. Bus bar 24 comprises a composite cross-sectional configuration having a first conductive portion 50 adjacent the exposed contact surface 25 and a second conductive portion 51 remote from this contact surface. Portion 50 comprises a hollow, substantially closed lobe having a relatively thin metal wall with an exterior portion of the wall serving as the exposed contact surface 25.

An electrical resistance heater wire 52 having a uniform outside insulating covering 55 extends within the hollow lobe 50.

A substantially rigid electrically insulating sheath 53 of low heat conductivity covers all of the bus bar except for a gap which extends along the length of the conductive lobe 50 and exposes the surface 25. This insulating sheath engages the exterior of the conductive bus bar in intimate contact along opposite sides of the contact surface 25 with, however, substantial interior portions thereof spaced away from the conductive bar to define interior air pockets 54 between the sheath and the bus bar.

Heated bus bar assemblies constructed in the manner shown have been found to be very effective in inhibiting the formation and retention of moisture during even severe conditions of snow and sleet. The low heat conductivity sheath 53 in combination with the insulating air pockets 54 contain the heat energy generated by the resistance heater wire 52 and substantially inhibits its dissipation by radiation, convection and conduction. A particular feature of the assembly shown is that lobe 50 physically confines the heater wire in a position proximate the inside wall of the contact surface, thereby insuring very efficient utilization of the heat energy derived from the resistance heater and uniform heat properties along the length of bus bar.

Another advantage of the bus bar assembly described hereinabove is that a plurality of heated bus bar sections may be assembled very economically. At one end of each section of bus bar 24 are located connector pins 60, 61 (FIGS. 5 and 6). These pins engage juxtaposed ends of an adjacent bus bar section and serve to fixedly join the respective sections in a given trolley electrification system. The upper pin 60 associated with bus bar portion 51 is of solid construction for maximum current conduction and the lower pin 61 associated with the bus bar lobe 50 contains a longitudinal hollow opening 62 through which the insulated heater wire 52 may extend into the next section. Each section provides a uniform continuous cavity into which the heater wire, of uniform outside configuration is easily threaded. The heater wire may thus be threaded through successive sections of bus bar without a single break or splice in the heater wire.

At each joint between respective sections of bus bar, a joint cover member 70 is applied to provide a continuous electrical and heat insulating sheath between the juxtaposed bus bar sections. An end cover 75 is used to insulate the ends of each bus bar run, the cover including an internal drive pin 76 for insertion in the upper portion 51 of the bus bar 24. An aperture 77 in the end of cover 75 permits the heater wire 52 to extend therefrom for connection to an electrical source of power.

A representative assembly of plural heated bus bar sections is illustrated in FIG. 6. As shown, the section 80 is fixedly mounted by hanger clamps (not shown) and the heater wire 52 threaded through the hollow connector pin 61 to the opposite end of the bus bar section 81. Section 81 will then be translated to the left in the figure to join mechanically and electrically section 80 via connector pins 60, 61 and bus bar section 80. The clamps 22 are then tightened and the exposed end of the heater wire 52 threaded through the hollow connector pin 61' of succeeding bus bar section 82 as shown, this operation being continued until the requisite number of sections have been mounted.

Electrical power is supplied the heated bus bar in the manner shown in FIG. 7. As shown, a first power source 90 is connected to the bus bar for energizing the movable collector assembly in engagement therewith. In addition, a second source of power 91 is connected to the heater wire 52 in series with a thermostat 92. This thermostat is exposed to the environment of the bus bar assembly and is preset to a value such that when the temperature of the bus bar assembly reaches a sufficiently low value, power is supplied the heater wire 52 for heating the same and prevents formation and retention of frozen moisture upon the exposed bus bar surface 25.

A preferred means for mounting the thermostat 92 is illustrated in FIG. 8. As shown, a hanger bracket 100 has been modified to support the thermostat 92 upon its upper surface, the bracket being clamped to the sheath covered bus bar by the depending sides 101, 102 of the bracket drawn together by the bolt 103.

An alternative heated bus bar assembly 110 is shown in FIG. 9. This assembly comprises an elongated thin wall conductive tube or cylinder 111 serving as the bus bar member and a sheath 112 substantially covering tube 111 but leaving an exposed contact surface 113 and forming interior air pockets 116 between the sheath and the bus bar. Electrical resistance heater wire 114 having an outside insulation covering 115 extends within the tube 111. The inside diameter of tube 111 is usually large with respect to the heater wire insulation 115 in order to obtain sufficient current carrying capacity and sufficient mechanical rigidity in the bus bar member 111.

The configuration of FIG. 9 embodies some of the useful features of the present invention. Thus, the sheath contains the heat energy produced by the heater wire 114 as described above. Further, the heater wire 114 will normally be retained proximate the exposed contact surface. However, this wire is sometimes relatively stiff and when inserted as shown inside the relatively large tube 111 may instead reside at the upper portion of the bus bar tube 111 as shown by the dotted lines. Gravity, therefore, may not always be effective to retain the heater wire proximate the inside wall of the exposed contact surface and hence the heat characteristics of this embodiment will be less dependable than the embodiment of FIGS. 4 and 5 wherein the lower, substantially closed lobe 50 physically confines the heater wire to a position proximate the exposed contact surface 25.

By way of illustration only, the following specific example is given as a typical trolley electrification system constructed in accordance with this invention. The bus bar conductor is formed of copper or steel and has cross-sectional dimensions of 1 x ⅜ inch and a standard length of 10 feet. A steel bar having these dimensions and the cross-sectional configuration of FIGS. 4 and 5 is rated for 90 amperes, 600 volts A.C., 250 volts D.C. continuous service and a copper bar of like dimensions and configuration is rated for 300 amperes, 600 volts A.C., 250 volts D.C. continuous service. The inside diameter of the lobe 50 is ¼ inch and the outside diameter of the resistance heater wire is 3/32 to ⅛ inch. The sheath 53 is formed of polyvinyl chloride plastic having the low thermal conductivity of about .0004 (defining calories per second through a plate one centimeter thick across an area of one square centimeter when the temperature difference is one degree centigrade). The contained air pockets 54 have an even lower thermal conductivity of about 0.00005. By way of comparison, steel has a thermal conductivity of 0.113 and copper a conductivity of 1.00. Suitable resistance wire having uniform nylon insulation is manufactured and sold by Everwarm, Inc., of Knoxville, Tennessee, as No. E-25456-90° C. Power is supplied to this heater wire to dissipate on the order of 5 watts per foot. An 80-foot run of heater wire (through eight standard bus bar sections) has, for example, a total resistance of 35 ohms and will dissipate a total of 341 watts or 4.25 watts per foot when connected to 110 volts. The thermostat is preset to continuously energize the resistance heater when the environmental temperature is reduced to 42° F. In a field installation, this trolley electrification system has been found to remain free of ice and other frozen moisture at temperatures as low as 5° F. This protection is quite adequate because of the low humidity associated with temperatures below this point.

Although an exemplary embodiment of the invention has been disclosed and discussed, it will be understood that other applications of the invention are possible and the embodiment and method disclosed may be subjected to various changes, modifications and substitutions without necessarily departing from the spirit of the invention.

I claim:

1. An elongated electrical bus bar adapted to be aerially fixedly supported as part of a trolley electrification system and having a contact surface extending along it for engagement by a traveling current collector;

said bus bar formed of a plurality of bus bar sections connected in end-to-end relation, each one of which has a relatively thin metal wall shaped in an oblong cross-sectional configuration which includes a first portion approximating a substantially closed hollow lobe on the exterior of which is formed the contact surface and a second portion of substantial current carrying capacity disposed remote from the contact surface;

an elongated, substantially rigid plastic insulating sheath engaged over and covering a major portion of the bus bar exterior, the insulating sheath having a gap which runs along the length of the bus bar and exposes the contact surface thereof, and a heater wire extending along within said hollow lobe of the bus bar sections without break or splice, the heater wire having an electrically insulative, uniform covering the outside diameter of which is substantially less than the inside diameter of the hollow lobes.

2. In a trolley electrification system including an aerially fixedly supported, electrically energized bus bar and an electrical collector for slidably engaging an exposed surface of said bus bar, means for preventing formation and retention of frozen water upon said exposed surface comprising an electrically insulated, resistance heater wire extending through a hollow, substantially closed lobe of said bus bar and physically confined proximate said exposed surface, said resistance heater wire having a uniform electrical insulation covering, the outside diameter of said coveerd heater wire being substantially smaller than the inside diameter of said bus bar lobe, and a sheath formed of low heat conductivity material substantially covering all of said bus bar execpt said exposed surface for containing the heat energy therewithin.

3. The trolley electrification system defined in claim 2 wherein said sheath is formed of a plastic material having a thermal conductivity of the order of 0.0004 calorie per second through a plate one centimeter thick across an area of one square centimeter when the temperature difference is one degree centigrade.

4. The trolley electrification system defined in claim 2 wherein the sheath engages the exterior of the bus bar in intimate contact along opposite sides of the exposed bus bar contact surface, and said sheath has substantial interior portions spaced away from the bus bar to define interior air pockets between the sheath and the bus bar.

5. The elongated electrical bus bar defined in claim 2 wherein said bus bar is a single elongated conductive tube of generally circular cross-section, an elongated portion of the exterior wall of said tube forming said exposed surface and the interior of said tube forming said lobe proximate the contact surface.

6. The elongated electrical bus bar defined in claim 2 wherein said bus bar has a composite cross-sectional configuration comprising a first conductive portion defining said substantially closed hollow lobe disposed proximate the exposed surface and a second conductive portion of substantial current carrying capacity disposed remote from the exposed surface, an elongated portion of the exterior wall of said lobe forming said exposed surface.

7. An elongated electrical bus bar adapted to be aerially fixedly supported as a trolley electrification system and having a longitudinal contact surface for engagement by a traveling current collector;

the bus bar having a cross-sectional configuration which includes a cavity;

an elongated insulating sheath covering a major portion of the bus bar exterior and leaving the longitudinal contact surface accessibly exposed; and a heater wire having an electrically insulative covering the outside diameter of which is substantially less than the inside diameter of said cavity extending along within said cavity and in contact with surfaces defining said cavity.

8. An elongated electrical bus bar in accordance with claim 7 wherein said bus bar includes a thin metal wall which provides the contact surface, and the heater wire in the cavity is proximate the interior side of the thin wall which acts as the contact surface.

References Cited by the Examiner

UNITED STATES PATENTS

| 557,258 | 3/1896 | Delany | 191—27 |
| 2,860,198 | 11/1958 | Ford et al. | 191—23 X |
| 2,870,311 | 1/1959 | Greenfield et al. | 191—27 X |
| 3,189,679 | 6/1965 | Scofield | 191—44.1 X |

FOREIGN PATENTS

| 543,331 | 2/1942 | Great Britain. |
| 885,765 | 12/1961 | Great Britain. |

OTHER REFERENCES

Wevers, German printed patent specification, 1,028,607, printed October 9, 1958 (Kl. 20k).

ARTHUR L. LA POINT, *Primary Examiner.*

S. T. KRAWCZEWICZ, *Assistant Examiner.*

UNITED STATES PATENT OFFICE
CERTIFICATE OF CORRECTION

Patent No. 3,300,593 January 24, 1967

Alfred J. Luberts

It is hereby certified that error appears in the above numbered patent requiring correction and that the said Letters Patent should read as corrected below.

Column 5, line 59, for "coveerd" read -- covered --; line 63, for "execpt" read -- except --; column 6, line 48, for "thin wall" read-- thin metal wall --.

Signed and sealed this 14th day of November 1967.

(SEAL)
Attest:

Edward M. Fletcher, Jr.
Attesting Officer

EDWARD J. BRENNER
Commissioner of Patents